(12) United States Patent
Sano

(10) Patent No.: US 12,297,870 B2
(45) Date of Patent: May 13, 2025

(54) HALF THRUST BEARING

(71) Applicant: DAIDO METAL COMPANY LTD., Nagoya (JP)

(72) Inventor: Seiji Sano, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 172 days.

(21) Appl. No.: 18/165,360

(22) Filed: Feb. 7, 2023

(65) Prior Publication Data

US 2023/0258224 A1 Aug. 17, 2023

(30) Foreign Application Priority Data

Feb. 16, 2022 (JP) .................. 2022-021839

(51) Int. Cl.
*F16C 9/02* (2006.01)
*F16C 17/04* (2006.01)
*F16C 33/04* (2006.01)

(52) U.S. Cl.
CPC ................ *F16C 9/02* (2013.01); *F16C 17/04* (2013.01); *F16C 33/046* (2013.01)

(58) Field of Classification Search
CPC .... F16C 9/02; F16C 9/04; F16C 17/04; F16C 17/045; F16C 17/047; F16C 33/046; F16C 33/1075
See application file for complete search history.

(56) References Cited

U.S. PATENT DOCUMENTS

| 9,909,614 B2* | 3/2018 | Tanaka | F16C 17/04 |
| 10,641,317 B2* | 5/2020 | Amano | F16C 9/02 |
| 2003/0128902 A1* | 7/2003 | Kennedy | F16C 17/10 384/275 |
| 2011/0200281 A1* | 8/2011 | Uehara | F16C 43/02 384/428 |

FOREIGN PATENT DOCUMENTS

| JP | 2001-323928 A | 11/2001 |
| JP | 2017-172607 A | 9/2017 |

* cited by examiner

*Primary Examiner* — James Pilkington
(74) *Attorney, Agent, or Firm* — Harness, Dickey & Pierce, P.L.C.

(57) ABSTRACT

A half thrust bearing includes a slide surface which includes: at least two oil grooves extending in a radial direction; a plurality of pad surfaces located on both sides of each oil groove in a circumferential direction; and at least two first inclined surfaces each formed between the oil groove and the pad surface on a front side of the oil groove in a rotation direction of a crankshaft. A plurality of circumferential grooves are formed in succession in the radial direction on the first inclined surface. A plurality of oil drain grooves extends side by side to intersect the circumferential direction and the radial direction on the pad surface. A plurality of flat portions are formed each between the adjacent oil drain grooves. Each oil drain groove is open at a radially outer end and/or a radially inner end of the pad surface.

6 Claims, 7 Drawing Sheets

A-A SECTION

B-B SECTION

A1 ENLARGED VIEW

C-C SECTION

PRIOR ART

D-D SECTION

HALF THRUST BEARING

CROSS REFERENCE TO RELATED APPLICATIONS

This application claims the benefit and priority of JP 2022-021839, filed Feb. 16, 2022. The entire disclosure of the above application is incorporated herein by reference.

BACKGROUND OF THE INVENTION

(1) Field of the Invention

The present invention relates to a semi-annularly shaped half thrust bearing having a slide surface for receiving axial force of a crankshaft of an internal combustion engine.

(2) Description of Related Art

A crankshaft of an internal combustion engine is rotatably supported, at a journal portion thereof, by a cylinder block lower portion of the internal combustion engine via a main bearing which is configured by combining a pair of half bearings into a cylindrical shape. One or both of the pair of half bearings are used in combination with a half thrust bearing which receives axial force of the crankshaft. The half thrust bearing is provided in one or both of end faces of the half bearing that face in an axial direction.

The half thrust bearing receives the axial force generated in the axial direction of the crankshaft. That is to say, the half thrust bearing is arranged for the purpose of bearing the axial force input to the crankshaft at the time of connecting the crankshaft and a transmission by means of a clutch.

As described above, a crankshaft of an internal combustion engine is supported, at a journal portion thereof, by a cylinder block lower portion of the internal combustion engine via a main bearing consisting of a pair of half bearings. Lubricating oil is fed into a lubricating oil groove formed along the inner peripheral surface of the main bearing from an oil gallery in a cylinder block wall through a through-hole in a wall of the main bearing. In this way, the lubricating oil is supplied into the lubricating oil groove of the main bearing, and then supplied to a half thrust bearing.

Meanwhile, in recent years, crankshafts have been reduced in diameter for the purpose of saving the weight of internal combustion engines, and have been decreasing in rigidity as compared with conventional crankshafts. Thus, bending easily occurs in a crankshaft during the running of the internal combustion engine, and vibration of the crankshaft tends to increase. Therefore, a slide surface of a half thrust bearing directly contacts a thrust collar surface of the crankshaft, which causes damage such as seizure to easily occur. As a measure against this, there has been suggested a technique which provides a plurality of pad portions in the slide surface of the half thrust bearing, and provides an oil groove and an inclined surface between the pad portions, thereby forming a high-pressure oil film in a clearance between the inclined surface and the thrust collar surface during the running of the internal combustion engine, and making it difficult for the slide surface of the half thrust bearing to directly contact the thrust collar surface of the crankshaft (e.g. see JP 2017-172607 A).

There has been also suggested a technique which forms a circumferentially extending narrow groove on a slide surface of a half thrust bearing in succession in the radial direction, thereby supplying oil to the entire slide surface to prevent the seizure of the slide surface (e.g. see JP 2001-323928 A).

BRIEF SUMMARY OF THE INVENTION

However, even if the technique of JP 2017-172607 A or JP 2001-323928 A is employed, the oil flowing in the clearance between the slide surface of the half thrust bearing and the thrust collar surface of the crankshaft becomes high in temperature when a vibration time (duration of the vibration) of the above-described crankshaft is long. This heat propagates, and the slide surface (pad portion) becomes high in temperature, so that it was difficult to prevent the occurrence of seizure of the half thrust bearing.

Therefore, an object of the present invention is to provide a half thrust bearing for a crankshaft of an internal combustion engine that can restrain the occurrence of seizure during the running of the internal combustion engine.

According to the present invention, there is provided a semi-annularly shaped half thrust bearing for receiving axial force of a crankshaft of an internal combustion engine, the thrust bearing comprising a slide surface for receiving the axial force and a back surface on an opposite thereof, and defining an axial direction, a circumferential direction and a radial direction, wherein the slide surface comprises:
  at least two oil grooves each radially extending from a radially inner end to a radially outer end of the slide surface;
  a plurality of pad surfaces located on both sides of each oil groove in the circumferential direction, wherein an axial thickness from the back surface to the pad surface is constant; and
  at least two first inclined surfaces, each first inclined surface being formed between the oil groove and the pad surface so as to be located on a front side of the oil groove in a rotation direction of the crankshaft, wherein an axial thickness from the back surface to the first inclined surface is gradually smaller in the circumferential direction from a pad surface side toward an oil groove side,
  wherein a plurality of circumferential grooves extending in the circumferential direction are formed in succession in the radial direction on the first inclined surface, and
  wherein a plurality of oil drain grooves extending side by side so as to intersect the circumferential direction and the radial direction are formed on the pad surface, a plurality of flat portions parallel to the back surface are formed between the plurality of oil drain grooves, and each oil drain groove is open at at least one of a radially outer end and a radially inner end of the pad surface.

According to the present invention, a groove depth (D2) of the circumferential groove formed on the first inclined surface may be 1 to 10 μm, and a groove width (W2) of the circumferential groove formed on the first inclined surface may be 0.05 to 0.3 mm.

According to the present invention, the slide surface may further comprise at least two second inclined surfaces, wherein each second inclined surface is formed between the oil groove and the pad surface so as to be located on a rear side of the oil groove in the rotation direction of the crankshaft, and an axial thickness from the back surface to the second inclined surface is gradually smaller in the circumferential direction from the pad surface side toward the oil groove side, and a plurality of circumferential grooves extending in the circumferential direction may be formed in succession in the radial direction on the second inclined surface.

According to the present invention, a groove depth (D2) of the circumferential groove formed on the second inclined surface may be 1 to 10 μm, and a groove width (W2) of the circumferential groove formed on the second inclined surface may be 0.05 to 0.3 mm.

According to the present invention, a groove depth (D3) of the oil drain groove may be 2 to 20 μm, and a groove width (W3) of the oil drain groove may be 0.1 to 0.5 mm. further, the plurality of oil drain grooves (84G) may be arranged side by side with a pitch (P1) of 0.2 to 1 mm.

DESCRIPTION OF THE EMBODIMENTS

Hereinafter, embodiments of the present invention and advantages thereof will be described in detail with reference to the accompanying schematic drawings. Note that, the embodiments presented below are merely illustrative, and do not limit the present invention.
(Overall Configuration of Bearing Device)

Figure 1:
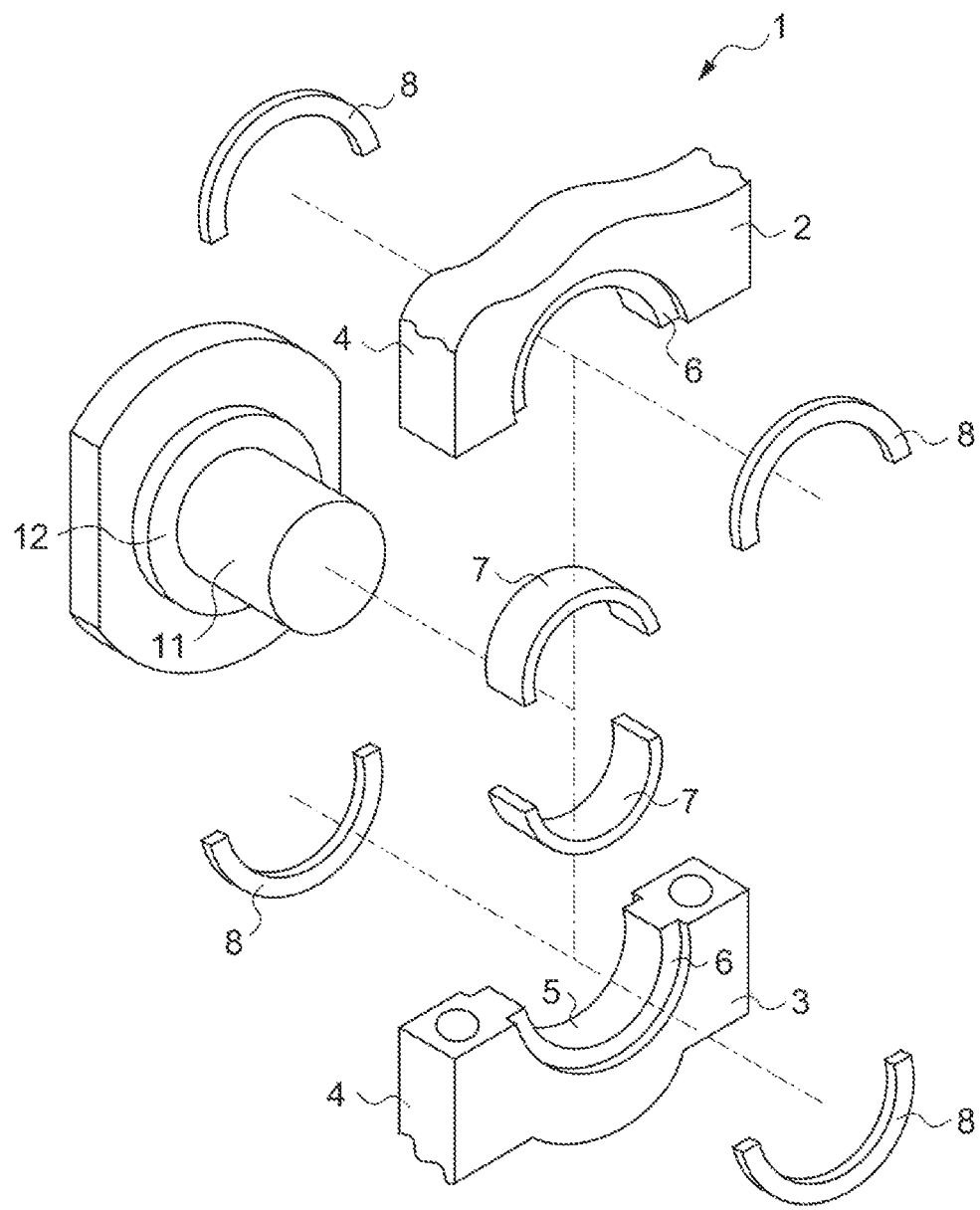
FIG. 1 is an exploded perspective view of a bearing device.
Figure 7:
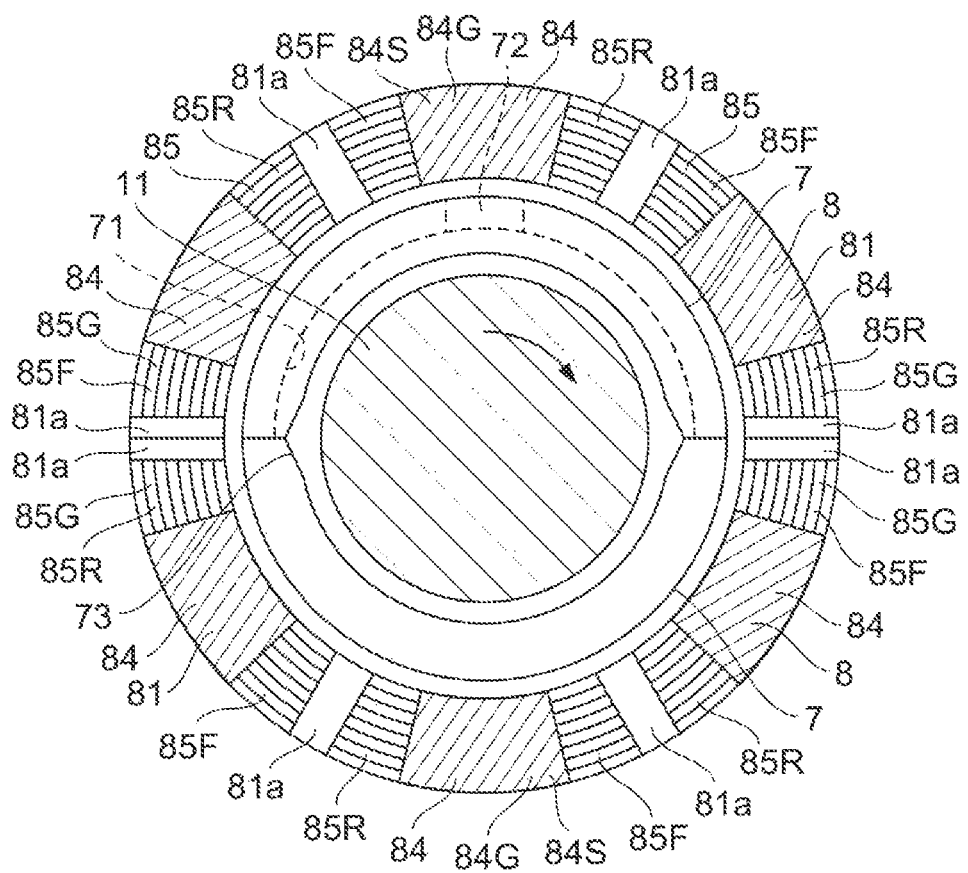
FIG. 7 is a front view of a bearing device including a half bearing and a thrust bearing.
Figure 8:
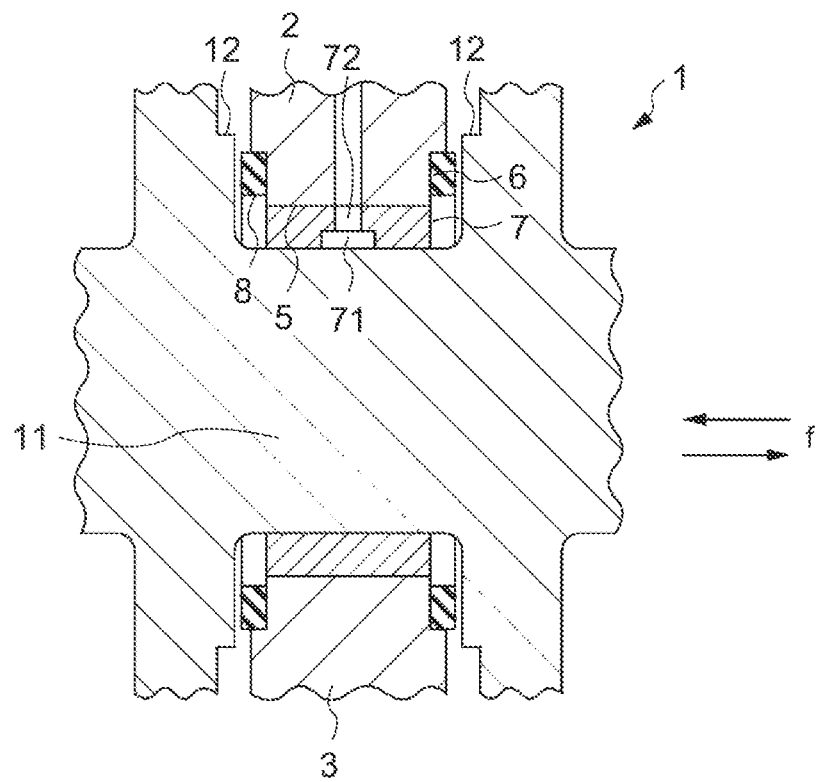
FIG. 8 is a sectional view of the bearing device.

Firstly, the overall configuration of a bearing device 1 including a half thrust bearing 8 of the present invention is described by use of FIGS. 1, 7, and 8. As illustrated in FIGS. 1, 7, and 8, a bearing hole (holding hole) 5 which is a circular hole piercing between both side surfaces is formed in a bearing housing 4 configured by mounting a bearing cap 3 onto a lower portion of a cylinder block 2, and accept seats 6, 6 which are circular-ring-shaped recesses are formed on the peripheral edge of the bearing hole 5 on the side surface. Half bearings 7, 7 which rotatably bear a journal portion 11 of a crankshaft are combined into a cylindrical shape and fitted into the bearing hole 5. Half thrust bearings 8, 8 which receive axial force f (see FIG. 8) via a thrust collar 12 of the crankshaft are combined into an annular shape and fitted into the accept seats 6, 6.

As illustrated in FIG. 7, a lubricating oil groove 71 is formed on the inner peripheral surface of the half bearing 7 on the cylinder block 2 side (upper side) among the half bearings 7 constituting a main bearing, and a through-hole 72 piercing from the lubricating oil groove 71 to an outer peripheral surface is formed. In addition, the lubricating oil groove 71 may be formed in each of both upper and lower half bearings. Moreover, crush reliefs 73 are formed in the half bearing 7, at both peripheral ends adjacent to abutment surfaces of the half bearings 7.

In the bearing device 1, oil pressurized and discharged from an oil pump (not illustrated) is supplied from an internal oil path of the cylinder block 2 to the lubricating oil groove 71 on the inner peripheral surface of the half bearing 7 through the through-hole 72 piercing the wall of the half bearing 7. A part of the oil supplied into the lubricating oil groove 71 is supplied to the inner peripheral surface of the half bearing 7, another part enters an opening of a non-illustrated internal oil path of the crankshaft that is formed on the surface of the journal portion 11 and is fed to a crankpin side, and still another part flows out to the outside from both ends of the half bearing 7, 7 in the width direction through a clearance between the surface of the crush relief 73 of each of a pair of the half bearings 7, 7 constituting the main bearing and the surface of the journal portion 11 of the crankshaft. The oil which has flowed out to the outside from both ends of each of the half bearing 7 in the width direction mainly flows into a clearance surrounded by the surface of the thrust collar 12 of the crankshaft, the accept seat 6 of the housing, the radially inner surface of the half thrust bearing 8, and the surface of the journal portion 11 of the crankshaft, and then flows into an oil groove 81a of a slide surface 81 of the half thrust bearing 8. The oil which has flowed into the oil groove 81a flows to a first inclined surface 85F of the slide surface 81 of the half thrust bearing 8, and a pad surface 84, in this order, by accompanying the surface of the rotating thrust collar 12.

Generally, a thrust bearing bears axial force f from the crankshaft by generation of pressure between the slide surface 81 of the thrust bearing and the surface of the thrust collar 12 of the crankshaft.

During the running of the internal combustion engine, when vibration resulting from deflection of the crankshaft increases, the surface of the thrust collar 12 of the crankshaft repeats the approaching action and the separating action while changing the tilt angle to the slide surface 81 of the half thrust bearing, or undulating.

Figure 10A:
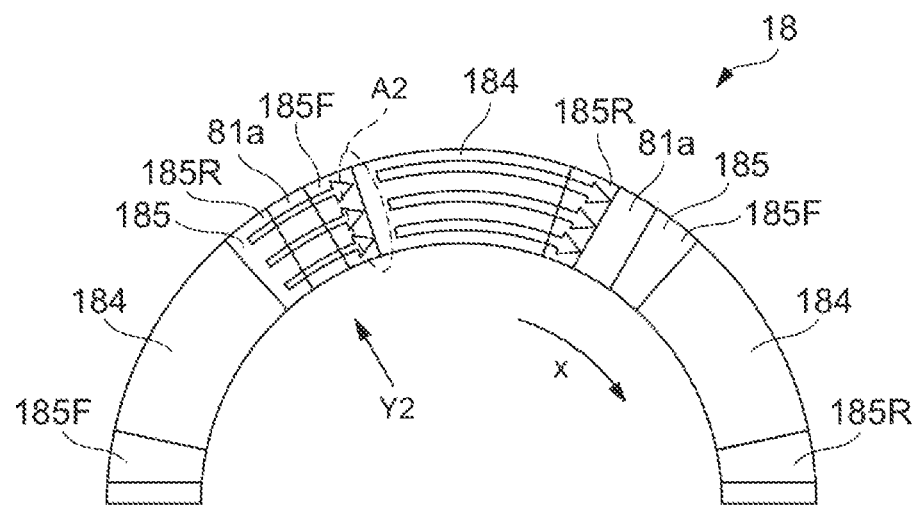
FIG. 10A is a view for describing the action of a prior art.
Figure 10B:
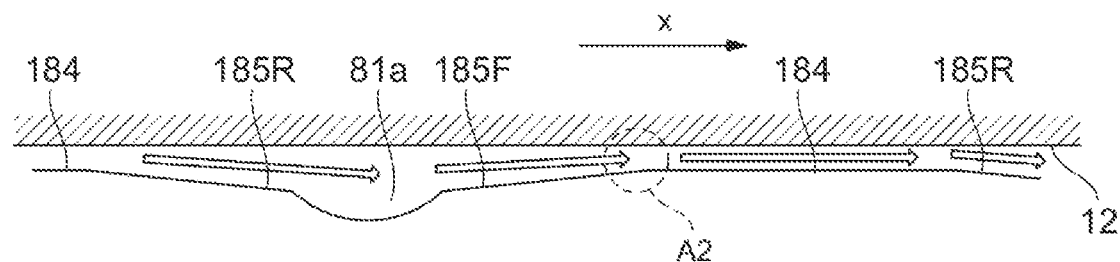
FIG. 10B is a view for describing the action of the prior art.

Here, the configuration of a prior-art half thrust bearing 18 having a plurality of inclined surfaces and a pad surface on a slide surface, and the action thereof are described by use of FIGS. 10A and 10B. FIG. 10A is a front view in which the slide surface side of the half thrust bearing 18 is seen, and FIG. 10B is a view from the arrow Y2 in FIG. 10A, where an arrow X indicates the rotation direction of the thrust collar 12, and a white arrow indicates the flow of oil.

The slide surface of the prior-art half thrust bearing 18 includes a plurality of pad surfaces 184, a plurality of inclined surfaces 185, and a plurality of oil grooves 81a. Each of the pad surfaces 184 is formed in such a way that the axial thickness between the pad surface 184 and the back surface of the half thrust bearing 18 is constant. Each of the oil grooves 81a is formed between the pad surfaces 184 so as to radially extend from the center of the half thrust bearing 18. The plurality of inclined surfaces 185 include a first inclined surface 185F formed in such a way that the axial thickness decreases toward the oil groove 81a from the circumferential end of the pad surface 184 on the rear side in the rotation direction X of the crankshaft, and a second inclined surface 185R formed in such a way that the axial thickness decreases toward the oil groove 81a from the circumferential end of the pad surface 184 on the front side in the rotation direction X of the crankshaft. Each of the pad surface 184, the first inclined surface 185F, and the second inclined surface 185R is made flat. A wedged clearance which becomes gradually narrower toward the front side in the rotation direction X of the thrust collar 12 is formed between the first inclined surface 185F and the surface of the thrust collar 12 (see FIG. 10B).

In the prior-art half thrust bearing 18, vibration resulting from deflection of the crankshaft increases during the running of the internal combustion engine, so that when the surface of the thrust collar 12 of the crankshaft has approached the slide surface, the oil among the oil groove 81a, the first inclined surface 185F, the second inclined surface 185R, and the surface of the thrust collar 12 flows toward the circumferential end side of the wedged clearance on the front side in the rotation direction X between the first inclined surface 185F and the surface of the thrust collar 12 by accompanying the surface of the rotating thrust collar 12. This oil becomes high in pressure in response to a hydrodynamic action when flowing through the wedged clearance, and a high-pressure oil film having the maximum pressure in the vicinity of the circumferential end of the wedged clearance (in the vicinity of a dashed ellipse A2 in FIG. 10A and a dashed circle A2 in FIG. 10B) is formed, so that contact between the slide surface and the surface of the thrust collar 12 of the crankshaft hardly occurs.

However, when the duration in which the vibration of the crankshaft is great becomes long during the running of the internal combustion engine, the oil flowing in the clearance between the slide surface of the half thrust bearing 18 and the surface of the thrust collar 12 of the crankshaft becomes higher in temperature in the prior-art half thrust bearing 18. The slide surface (the pad surface 184) becomes high in temperature due to transmission of the heat, and the pressure of the oil film formed in the wedged clearance becomes insufficient due to the lowering of viscosity of the oil, so that the slide surface (the pad surface 184) of the half thrust bearing 18 easily comes into direct contact with the surface of the thrust collar 12 of the crankshaft, and seizure becomes easily caused in the half thrust bearing 18.

The reason of the above is described below in detail.

When the oil flows through the wedged clearance between the first inclined surface 185F and the surface of the thrust collar 12, the temperature increases simultaneously with increase in pressure in response to a hydrodynamic action. The oil which has increased in temperature flows in the circumferential direction through the clearance between the pad surface 184 and the surface of the thrust collar 12 by accompanying the surface of the rotating thrust collar 12, and then flows through the second inclined surface 185R located on the rear side in the rotation direction of the thrust collar 12, the oil groove 81a, and the clearance between the first inclined surface 185F and the surface of the thrust collar 12. Here, the oil again increases in temperature in response to a hydrodynamic action when flowing through the wedged clearance between the first inclined surface 185F and the surface of the thrust collar 12. The oil becomes higher in temperature by repeating increase in temperature in response to the repeated hydrodynamic actions. The heat of the oil is transmitted to the bearing material of the pad surface, and the pad surface also becomes high in temperature. Moreover, since the pressure of the oil film formed in the wedged clearance between the first inclined surface 185F and the surface of the thrust collar 12 becomes low due to the lowering of viscosity of the oil, contact between the pad surface 184 and the surface of the thrust collar 12 of the crankshaft becomes easily caused. Thus, damage (seizure) becomes easily caused in the pad surface 184 of the half thrust bearing 18.

The present invention deals with such a problem of the prior art. One example of the configuration of the half thrust bearing according to the present invention is described below.

(Configuration of Half Thrust Bearing)

The configuration of the half thrust bearing 8 according to a first embodiment of the present invention is illustrated in FIGS. 2 to 8. The half thrust bearing 8 is formed as a semi-annularly shaped flat plate from a bimetal in which a thin bearing alloy layer is adhesively bonded to a copper back metal layer. The half thrust bearing 8 includes the slide surface 81 which is the surface of the back metal layer and bears the thrust collar 12, and a back surface 82 which is the surface of the back metal layer opposite to the side to which the bearing alloy layer is adhesively bonded. The slide surface 81 includes the plurality of pad surfaces 84, a plurality of inclined surface portions 85, and the plurality of oil grooves 81a. Note that, the surface of the oil groove 81a may not be covered with the bearing alloy layer.

Figure 2:
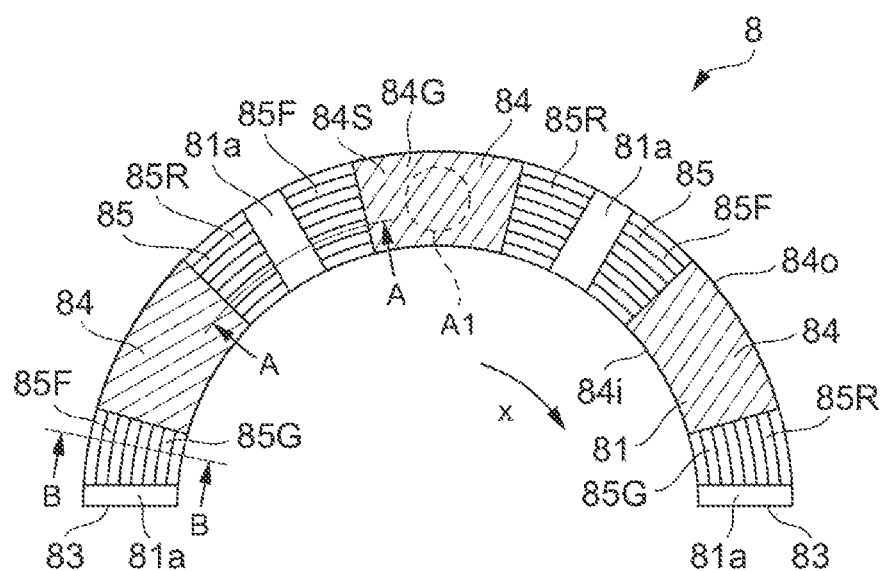
FIG. 2 is a front view of a half thrust bearing according to one embodiment of the present invention.
Figure 3:
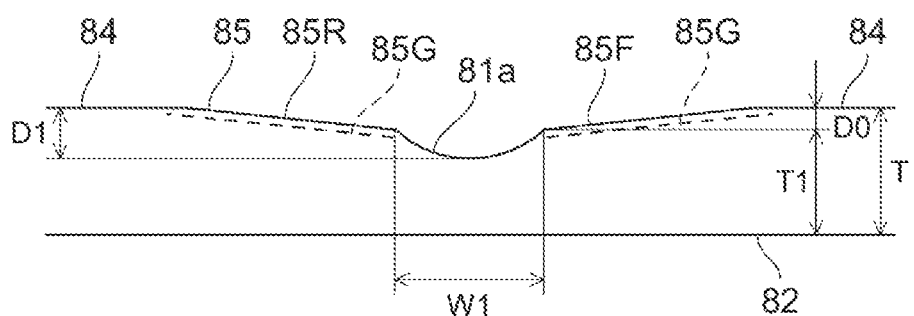
FIG. 3 is a sectional view of the half thrust bearing in FIG. 2 along the line A-A.
Figure 4:
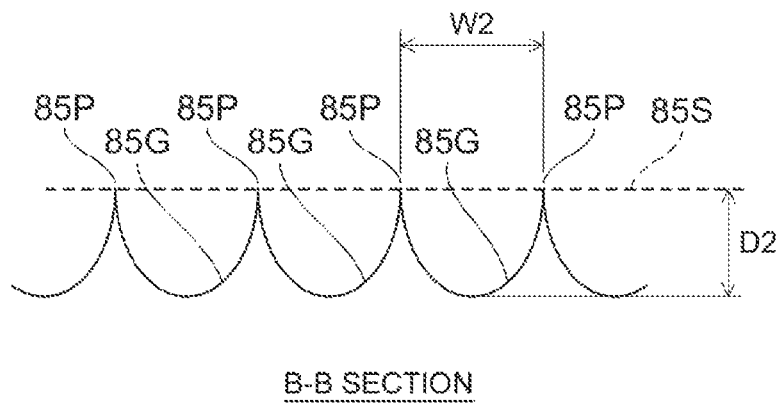
FIG. 4 is a sectional view of the half thrust bearing in FIG. 2 along the line B-B.

FIG. 2 is a front view of the half thrust bearing 8 according to the first embodiment of the present invention. FIG. 3 illustrates a section along the line C-C in FIG. 2.

In the plurality of pad surfaces 84, axial thickness T between the pad surface 84 and the back surface 82 is constant (i.e. the pad surface 84 is parallel to the back surface 82). The pad surface 84 is formed into a partly annular shape. Although the three pad surfaces 84 are arranged apart in the circumferential direction on the slide surface 81 of the half thrust bearing 8 in the present embodiment, the number of the pad surfaces 84 may be more than three, and three to five pad surfaces are generally formed.

Each of the plurality of oil grooves 81a is arranged between the pad surfaces 84 so as to extend radially (i.e. in the radial direction) from the radially inner end to the radially outer end of the half thrust bearing 8. Note that, in the present embodiment, in addition to the two oil grooves 81a between the pad surfaces 84, the partial oil groove 81a is formed adjacent to both circumferential end faces 83, 83 of the half thrust bearing 8 in such a way that the oil groove 81a is formed in each abutment portion when the two half thrust bearings 18 are combined.

As specific dimensions of the oil groove 81a, in the case that a crankshaft of a small internal combustion engine such as a passenger vehicle (the diameter of a journal portion is about 30 to 100 mm) is used, a groove width W1 of the oil groove 81a is 2 to 7 mm, a depth D1 of the oil groove 81a may be 0.2 to 1 mm, and, in the present embodiment, the peripheral section thereof is substantially annularly-shaped (see FIG. 3). Here, the depth D1 of the oil groove 81a is defined as the axial length of the half thrust bearing 8 from the pad surface 84 to the deepest portion of the oil groove 81a. Note that, the above-described dimensions are merely illustrative, and each dimension is not limited to these ranges.

The inclined surface portion 85 is arranged between the pad surface 84 and the oil groove 81a. The inclined surface portion 85 includes a first inclined surface 85F formed in such a way that the axial thickness thereof decreases toward the oil groove 81a from the circumferential end of the pad surface 84 on the rear side in the rotation direction X of the crankshaft, and having a minimum thickness T1 at a position adjacent to the oil groove 81a, and a second inclined surface 85R formed in such a way that the axial thickness thereof decreases toward the oil groove 81a from the circumferential end of the pad surface 84 on the front side in the rotation direction X of the crankshaft, and having the minimum thickness T1 at a position adjacent to the oil groove 81a. In the present embodiment, each of the first inclined surface 85F and the second inclined surface 85R is formed as a flat surface. In FIG. 2, the arrow X indicates the rotation direction of the crankshaft (the surface of the thrust collar 12).

Note that, the rotation direction X of the thrust collar surface relative to the half thrust bearings 8, 8 arranged on the left side accept seat 6 in the sheet illustrated in FIG. 8 is opposite to the rotation direction X of the thrust collar surface relative to the half thrust bearings 8, 8 arranged on the right accept seat 6 in the sheet. In the half thrust bearing 8 arranged on the side in the opposite direction (leftward rotation) to the rotation direction of the thrust collar 12 illustrated in FIGS. 2 and 7, the first inclined surface 85F in FIGS. 2 and 7 has the configuration of the second inclined surface 85R, and the second inclined surface 85R in FIGS. 2 and 7 has the configuration of the first inclined surface 85F.

A plurality of circumferential grooves 85G extending in the circumferential direction of the half thrust bearing 8 are formed on the surfaces of the first inclined surface 85F and the second inclined surface 85R. These circumferential grooves 85G are formed in succession in the radial direction on the first inclined surface 85F and the second inclined surface 85R, and therefore, no flat part is formed between the circumferential grooves 85G (see FIG. 4). A surface 85S of the first inclined surface 85F and the second inclined surface 85R is defined as a virtual flat surface including tops 85P of the plurality of circumferential grooves 85G (see FIG. 4).

The plurality of circumferential grooves 85G have the same groove width W2 and the same groove depth D2, and each circumferential groove 85 is formed with the constant groove width W2 and groove depth D2 over the longitudinal direction thereof.

A depth D0 of the first inclined surface 85F and the second inclined surface 85R defined as the axial length of the half thrust bearing 8 from the surface of the pad surface 84 to the surface 85S of the first inclined surface 85F and the second inclined surface 85R at a position adjacent to the oil groove 81a may be 5 to 30 μm. The length in the circumferential direction of the half thrust bearing 8 of each of the first inclined surface 85F and the second inclined surface 85R may be a length corresponding to a circumferential angle of 5° to 25°.

Moreover, the groove width W2 of the circumferential groove 85G defined as the length in the radial direction of the half thrust bearing 8 between the tops 85P of the adjacent circumferential grooves 85G may be 0.05 to 0.3 mm. The groove depth D2 of the circumferential groove 85G defined as the length in the axial direction of the half thrust bearing 8 from the top 85P of the circumferential groove 85G to the deepest portion of the circumferential groove 85G may be 1 to 10 μm. Note that the above-described dimensions are merely illustrative, and each dimension is not limited to these ranges.

A plurality of oil drain grooves 84G extending side by side so as to intersect the circumferential direction and the radial direction of the half thrust bearing 8 (i.e. in a direction different from the circumferential direction and the radial direction) are formed on each of the pad surfaces 84, and a plurality of flat portions 84S parallel to the back surface 82 are formed between the plurality of oil drain grooves 84G. In other words, each of the oil drain grooves 84G is a groove recessed from the plurality of flat portions 84S (or the pad surface 84) toward the back surface 82, and extends so as to open at at least one of a radially outer end 84o and a radially inner end 84i of the pad surface 84 (see FIG. 2).

Figure 5:
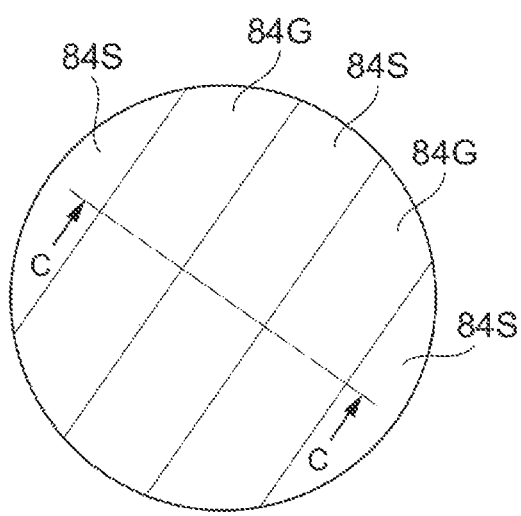
FIG. 5 is an enlarged view illustrating a pad surface inside the dashed circle A1
of the half thrust bearing in FIG. 2.
Figure 6:
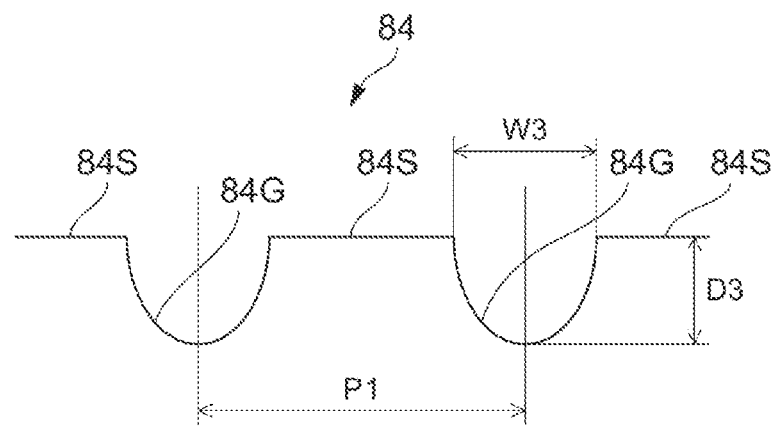
FIG. 6 is a sectional view of the pad surface in FIG. 5 along the line C-C.

FIG. 5 is an enlarged view of the pad surface 84 inside a dashed circle A1 in FIG. 2. FIG. 6 is a sectional view along the line C-C in FIG. 5. The C-C section crosses at right angles with the longitudinal direction of the oil drain groove 84G, and is within a plane parallel to the axial direction of the half thrust bearing 8. On the pad surface 84, the flat portions 84S and the oil drain grooves 84G are alternately arranged in a direction crossing at right angles with the longitudinal direction of the oil drain groove 84G, so that the oil drain grooves 84G do not cross (contact) each other.

Note that, the oil drain groove 84G linearly extends on the pad surface 84 in the present embodiment, but may be formed so as to extend while slightly curving.

The plurality of oil drain grooves 84G have the same groove width W3 and the same groove depth D3, and each oil drain groove 84G is formed with the constant groove width W3 and groove depth D3 over the longitudinal direction thereof.

The groove width W3 on the pad surface 84 in a direction crossing at right angles with the longitudinal direction of the oil drain groove 84G may be 0.1 to 0.5 mm. Moreover, the groove depth D3 of the oil drain groove 84G defined as the length in the axial direction of the half thrust bearing 8 from the pad surface 84 (or the flat portion 84S) to the deepest portion of the oil drain groove 84G may be 2 to 20 μm.

A pitch P1 of the oil drain groove 84G defined as the length between the deepest portions of the adjacent oil drain grooves 84G in a direction crossing at right angles with the longitudinal direction of the drain groove 84G may be 0.2 to 1 mm. Note that the above-described dimensions are merely illustrative, and each dimension is not limited to these ranges.

Figure 9A:
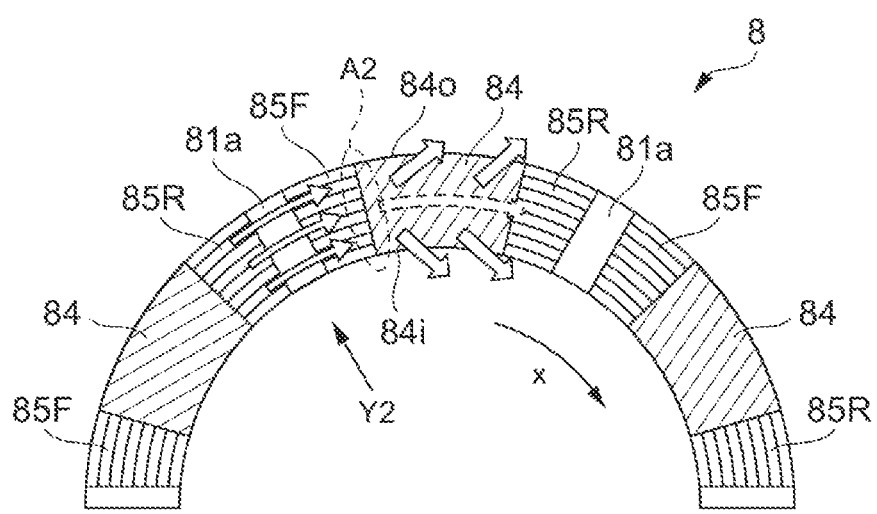
FIG. 9A is a view for describing the action of the present invention.
Figure 9B:
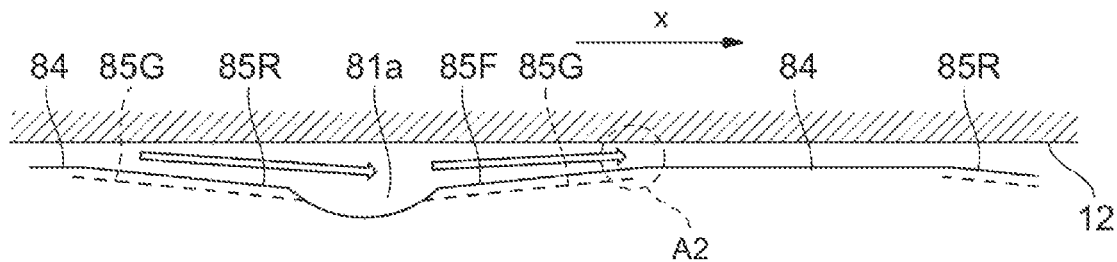
FIG. 9B is a view for describing the action of the present invention.

The reason that the seizure hardly occurs in the half thrust bearing 8 of the present invention is described below by use of FIGS. 9A and 9B. FIG. 9A is a front view in which the slide surface side of the half thrust bearing 8 is seen. FIG. 9B is a view from the arrow Y2 in FIG. 9A, where an arrow X indicates the rotation direction of the thrust collar 12, and a white arrow indicates the flow of oil.

As described above, when vibration resulting from deformation of the crankshaft increases during the running of the internal combustion engine, and the surface of the thrust collar 12 of the crankshaft moves close to the slide surface, oil among the oil groove 81a, the first inclined surface 85F, the second inclined surface 85R, and the surface of the thrust collar 12 flows toward the circumferential end side of the wedged clearance on the front side in the rotation direction between the first inclined surface 85F and the surface of the thrust collar 12 by accompanying the surface of the rotating thrust collar 12. Since the plurality of circumferential grooves 85G extending parallel to the circumferential direction of the half thrust bearing 8 are formed on the first inclined surface 85F, the oil is guided to the circumferential groove 85G, and becomes larger in amount of flowing toward the circumferential end side on the front side in the rotation direction of the wedged clearance. Thus, a large amount of oil suffers a hydrodynamic action in the vicinity of the circumferential end (the dashed circle A2) of the wedged clearance, and the pressure of an oil film formed in the vicinity of the circumferential end of the wedged clearance becomes higher than heretofore, so that contact between the pad surface 84 and the surface of the thrust collar 12 hardly occurs.

When the oil flows through the wedged clearance between the first inclined surface 85F and the surface of the thrust collar 12, the temperature increases simultaneously with increase in pressure in response to the hydrodynamic action. In the present embodiment, the plurality of oil drain grooves 84G are formed in the pad surface 84. The plurality of oil drain grooves 84G extend so as to intersect the circumferential direction and the radial direction of the half thrust bearing 8, and thereby open at at least one of a radially outer end 8o and a radially inner end 8i of the pad surface 84. Thus, most of high-temperature oil flowing into the space between the pad surface 84 and the surface of the thrust collar 12 from the wedged clearance between the first inclined surface 85F and the surface of the thrust collar 12 is guided to the oil drain groove 84G, and discharged to the outside from the radially outer end 8o or the radially inner end 8i of the pad surface 84 (a solid white arrow in FIG. 9A). On the other hand, the oil flowing up to the clearance among the second inclined surface 85R located on the front side of the pad surface 84 in the rotation direction of the thrust collar 12 than, the oil groove 81a, the first inclined surface 85F, and the surface of the thrust collar 12 (a dashed white arrow in FIG. 9A) becomes less. Thus, in the present invention, the pad surface 84 is restrained from becoming high in temperature due to transmission of the oil heat, and the slide surface 81 (or the pad surface 84) of the half thrust bearing 8 and the surface of the thrust collar 12 of the crankshaft are prevented from easily coming into direct contact with each other due to insufficient pressure of an oil film formed in the wedged clearance resulting from lowering of viscosity of the oil, so that seizure hardly occurs in the half thrust bearing 8.

Note that, as described above, the oil (low in temperature) having flowed out to the outside from both ends of the pair of half bearings 7, 7 constituting the main bearing in the width direction and flowed into the clearance surrounded by the surface of the thrust collar 12 of the crankshaft, the accept seat 6 of the bearing housing 4, the inside diameter surface of the half thrust bearing 8, and the surface of the journal portion 11 of the crankshaft is sequentially supplied to the clearance among the second inclined surface 85R, the oil groove 81a, the first inclined surface 85F, and the surface of the thrust collar 12.

A non-limited second embodiment according to another aspect of the present invention is described below.

Figure 11:
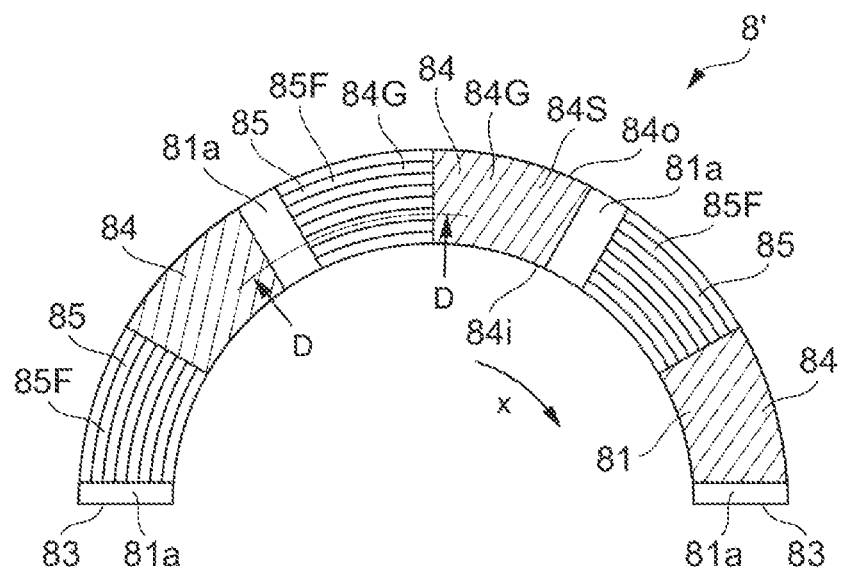
FIG. 11 is a front view of a half thrust bearing according to another embodiment of the present invention.
Figure 12:
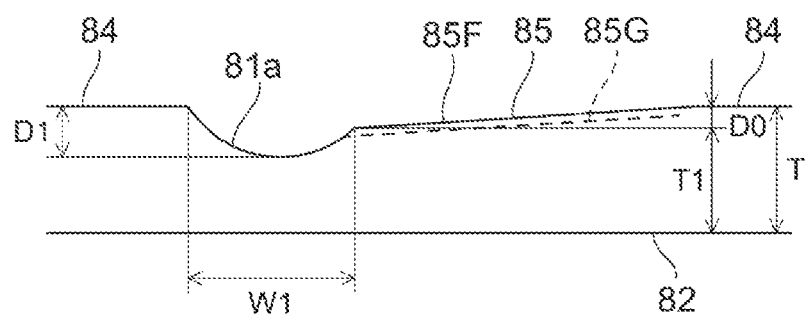
FIG. 12 is a sectional view of the half thrust bearing in FIG. 11 along the line D-D.

FIG. 11 is a front view of a half thrust bearing 8' according to the second embodiment of the present invention. FIG. 12 is a sectional view along the line D-D in FIG. 11.

In the embodiment illustrated in FIGS. 11 and 12, the plurality of inclined surface portions 85 of the half thrust bearing 8 includes only the first inclined surface 85F formed in such a way that the axial thickness decreases toward the oil groove 81a from the circumferential end of the pad surface 84 on the rear side in the rotation direction of the crankshaft. Therefore, the second inclined surface 85R, provided in the first embodiment, in which the axial thickness decreases toward the oil groove 81a from the circumferential end of the pad surface 84 on the front side in the rotation direction of the crankshaft is not formed. The other configuration than this is the same as the configuration of the half thrust bearing according to the first embodiment.

The half thrust bearing according to the present invention has been described above with the specific examples. Although a pair of half thrust bearings are combined into an annular shape so as to be configured to receive axial force of a crankshaft of an internal combustion engine in the examples used in the above description, the half thrust bearing according to the present invention may be used to solely receive the axial force of the crankshaft of the internal combustion engine.

Furthermore, the half thrust bearing according to the present invention may be formed from a bimetal consisting of a back metal layer and a bearing alloy as described above, and also may be formed only from a bearing alloy without a back metal layer. In this case, it will be appreciated that the surface which contacts the surface of the thrust collar 12 serves as a slide surface, and the opposite surface serves as a back surface.

Still further, the half thrust bearing according to the present invention is not limited to a semi-annular shape in which the circumferential length corresponds to a circumferential angle of 180°, and may be a substantially semi-annular shape in which the circumferential length corresponds to a circumferential angle slightly smaller than 180°. Moreover, in the half thrust bearing according to the present invention, the oil groove adjacent to the both circumferential end faces 83 may be replaced with the configuration of an inclined-surface-shaped thrust relief, or the configuration of the oil groove adjacent to the circumferential end face 83 may not be provided. Further, a configuration of a protrusion protruding from the outer peripheral surface of the half thrust bearing to the radially outer side may be provided for preventing wrong assembly of the half thrust bearing and for stopping rotation. In addition, a small number of grooves which do not open at neither the radially inner end 84i nor the radially outer end 84o of the pad surface 84 may be formed on the pad surface 84.

The invention claimed is:

1. A semi-annularly shaped half thrust bearing for receiving axial force of a crankshaft of an internal combustion engine, the thrust bearing comprising a slide surface for receiving the axial force and a back surface on an opposite side of the half bearing relative to the slide surface, the thrust bearing defining an axial direction, a circumferential direction and a radial direction, wherein the slide surface comprises:

at least two oil grooves each radially extending from a radially inner end to a radially outer end of the slide surface;

a plurality of pad surfaces located on both sides of each oil groove in the circumferential direction, wherein an axial thickness from the back surface to the pad surface is constant; and at least two first inclined surfaces, each of the at least two first inclined surfaces being formed between one of the at least two oil grooves and one of the plurality of pad surfaces so as to be located on a front side of the one of the at least two oil grooves in a rotation direction of the crankshaft, wherein an axial thickness from the back surface to the first inclined surface is smaller in the circumferential direction from a pad surface side toward an oil groove side, wherein a plurality of circumferential grooves extending in the circumferential direction are formed in succession in the radial direction on the first inclined surface, and wherein a plurality of oil drain grooves extending side by side so as to intersect the circumferential direction and the radial direction are formed on the pad surface, a plurality of flat portions parallel to the back surface are formed between the plurality of oil drain grooves, and each oil drain groove is open at at least one of a radially outer end and a radially inner end of the pad surface.

2. The half thrust bearing according to claim 1, wherein a groove depth of the circumferential grooves formed on the at least two first inclined surfaces is 1 to 10 μm, and a groove width of the circumferential grooves formed on the at least two first inclined surfaces is 0.05 to 0.3 mm.

3. The half thrust bearing according to claim 1, wherein the slide surface further comprises at least two second inclined surfaces, each of the at least two second inclined surfaces is formed between the one of the at least two oil grooves and the one of the plurality of pad surfaces so as to be located on a rear side of the one of the at least two oil grooves in the rotation direction of the crankshaft, an axial thickness from the back surface to the second inclined surface is smaller in the circumferential direction from the pad surface side toward the oil groove side, and a plurality of circumferential grooves extending in the circumferential direction are formed in succession in the radial direction on the second inclined surface.

4. The half thrust bearing according to claim 3, wherein a groove depth of the circumferential grooves formed on the at least two second inclined surfaces is 1 to 10 μm, and a groove width of the circumferential formed on the at least two second inclined surfaces is 0.05 to 0.3 mm.

5. The half thrust bearing according to claim 1, wherein a groove depth of the oil drain grooves is 2 to 20 μm, and a groove width of the oil drain grooves is 0.1 to 0.5 mm.

6. The half thrust bearing according to claim 5, wherein the plurality of oil drain grooves are arranged side by side with a pitch of 0.2 to 1 mm.

* * * * *